US010428692B2

(12) United States Patent
Parry et al.

(10) Patent No.: US 10,428,692 B2
(45) Date of Patent: Oct. 1, 2019

(54) TURBINE CENTER FRAME FAIRING ASSEMBLY

(71) Applicant: General Electric Company, Schenectady, NY (US)

(72) Inventors: David Walter Parry, Cincinnati, OH (US); Christopher Charles Glynn, Cincinnati, OH (US); John Creighton Schilling, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 380 days.

(21) Appl. No.: 15/303,258

(22) PCT Filed: Apr. 13, 2015

(86) PCT No.: PCT/US2015/025526
§ 371 (c)(1),
(2) Date: Oct. 11, 2016

(87) PCT Pub. No.: WO2015/157751
PCT Pub. Date: Oct. 15, 2015

(65) Prior Publication Data
US 2017/0030223 A1 Feb. 2, 2017

Related U.S. Application Data

(60) Provisional application No. 61/978,214, filed on Apr. 11, 2014.

(51) Int. Cl.
*F01D 25/24* (2006.01)
*F02C 7/20* (2006.01)

(52) U.S. Cl.
CPC .......... *F01D 25/243* (2013.01); *F01D 25/24* (2013.01); *F02C 7/20* (2013.01); *F05D 2220/30* (2013.01);
(Continued)

(58) Field of Classification Search
CPC .......... F01D 25/24; F01D 25/243; F02C 7/20; F04D 2220/30; F04D 2260/30; F04D 2300/5021; Y02T 7/20
See application file for complete search history.

(56) References Cited

U.S. PATENT DOCUMENTS 5,292,227 A 3/1994 Czachor et al.
5,357,744 A * 10/1994 Czachor ................. F01D 9/065
415/134

(Continued)

FOREIGN PATENT DOCUMENTS

EP 1149987 A2 10/2001
EP 1 149 987 B1 11/2005
(Continued)

OTHER PUBLICATIONS

International Search Report and Written Opinion issued in connection with corresponding PCT Application No. PCT/US2015/025526 dated Jun. 30, 2015.
(Continued)

*Primary Examiner* — Igor Kershteyn
(74) *Attorney, Agent, or Firm* — General Electric Company; William Scott Andes

(57) ABSTRACT

A fairing assembly is provided which is located between a frame hub and an engine casing. The assembly provides for use of a metallic structure in combination with a light weight low alpha material in order to improve engine efficiency and performance. Relative growth between the dissimilar materials is compensated for by a flexible bracket which provides biasing force on one of the assembly components in a cold engine condition as well as allowing for growth at the high temperature operating conditions of the engine.

20 Claims, 9 Drawing Sheets

(52) U.S. Cl.
CPC .. *F05D 2260/30* (2013.01); *F05D 2300/5021* (2013.01); *Y02T 50/672* (2013.01)

(56) References Cited

U.S. PATENT DOCUMENTS

| | | | |
|---|---|---|---|
| 5,451,116 A * | 9/1995 | Czachor | ............ F01D 9/065 403/338 |
| 5,609,467 A | 3/1997 | Lenhart et al. | |
| 5,630,700 A | 5/1997 | Olsen et al. | |
| 6,464,456 B2 | 10/2002 | Darolia et al. | |
| 7,762,768 B2 | 7/2010 | Shi et al. | |
| 7,824,152 B2 | 11/2010 | Morrison | |
| 8,292,580 B2 | 10/2012 | Schiavo et al. | |
| 8,454,303 B2 | 6/2013 | Garcia-Crespo | |
| 8,905,711 B2 | 12/2014 | Suciu et al. | |
| 8,956,105 B2 | 2/2015 | Uskert et al. | |
| 2011/0252808 A1 | 10/2011 | McKenney et al. | |
| 2011/0286847 A1 | 11/2011 | King | |
| 2013/0094951 A1 | 4/2013 | McCaffrey | |
| 2014/0003880 A1 | 1/2014 | Grooms, II | |
| 2014/0093358 A1 | 4/2014 | Chang et al. | |
| 2014/0248146 A1 | 9/2014 | Sander et al. | |
| 2014/0255174 A1 | 9/2014 | Duelm et al. | |
| 2015/0345399 A1 * | 12/2015 | Budnick | ............ F01D 9/041 415/213.1 |

FOREIGN PATENT DOCUMENTS

| | | |
|---|---|---|
| JP | H07-145744 A | 6/1995 |
| JP | 2005-180418 A | 7/2005 |
| JP | 2013-057302 A | 3/2013 |
| JP | 2013-520609 A | 6/2013 |

OTHER PUBLICATIONS

Notification of Reasons for Refusal issued in connection with corresponding JP Application No. 2016-560959 dated Aug. 15, 2017.

Notice of Allowance issued in connection with corresponding JP Application No. 2016-560959 dated Jul. 31, 2018 (English Translation not available).

* cited by examiner

TURBINE CENTER FRAME FAIRING ASSEMBLY

TECHNICAL FIELD

The present embodiments relate generally to a fairing assembly for use in a gas turbine engine. More specifically, present embodiments relate to, but are not limited to, a fairing assembly including a metal bracket which compensates for relative growth between the lower coefficient of thermal expansion fairing material and the higher coefficient of thermal expansion material strut extending through the assembly.

BACKGROUND

A gas turbine engine includes a turbomachinery core having a high pressure compressor, combustor, and high pressure turbine ("HPT") in serial flow relationship. The core is operable in a known manner to generate a primary gas flow. The high pressure turbine includes annular arrays ("rows") of stationary vanes or nozzles that direct the gases exiting the combustor into rotating blades or buckets. Collectively one row of nozzles and one row of blades make up a "stage". Typically two or more stages are used in serial flow relationship. These components operate in an extremely high temperature environment, and must be cooled by air flow to ensure adequate service life.

HPT nozzles are often configured as an array of airfoil-shaped vanes extending between annular inner and outer bands which define the primary flowpath through the nozzle.

Due to operating temperatures within the gas turbine engine, it may be desirable to utilize materials with high temperature capability and additionally low coefficient of thermal expansion. For example, to operate effectively in such strenuous temperature and pressure conditions, composite materials have been suggested and, in particular for example, ceramic matrix composite (CMC) materials. These low coefficient of thermal expansion materials have higher temperature capability than metallic parts. The higher operating temperatures within the engine result in higher engine efficiency and these materials may be lighter weight than traditionally used metals. However, such ceramic matrix composite (CMC) have mechanical properties that must be considered during the design and application of the CMC. CMC materials have relatively low tensile ductility or low strain to failure when compared to metallic materials. Also, CMC materials have a coefficient of thermal expansion which differs significantly from metal alloys used as restraining supports or hangers for CMC type materials.

A fairing assembly is located between the high pressure turbine and low pressure turbine within a gas turbine engine. The fairing forms a flow path between these high pressure and low pressure turbines and is generally made of metallic castings. However, it may be desirable to utilize a fairing assembly of which at least a portion is formed of a low coeffiecient of material which may be desirable due to its light weight, low coefficient of thermal expansion and high temperature capability.

Turbine center frame fairings are generally made of nickel based cast metallic alloys and use of a ceramic material may provide desirable weight savings which result in improved efficiency and performance of the gas turbine engine.

However, problems associated with dissimilar materials create relative growth problems between the adjacent connected parts. It may be desirable to overcome these and other deficiencies known in fairing assemblies in order to reduce fuel consumption, as well as potentially increasing operating temperature capability for gas turbine engines.

The information included in this Background section of the specification, including any references cited herein and any description or discussion thereof, is included for technical reference purposes only and is not to be regarded subject matter by which the scope of the disclosure is to be bound.

BRIEF DESCRIPTION

A fairing assembly is provided which is located between a frame hub and an engine casing. The assembly provides for use of a metallic structure in combination with a light weight low alpha material in order to improve engine efficiency and performance. Relative growth between the dissimilar materials is compensated for by a flexible bracket which provides biasing force on one of the assembly components in a cold engine condition as well as allowing for growth at the high temperature operating conditions of the engine.

According to some embodiments, a fairing assembly comprises a frame hub which is spaced radially inwardly from a casing, a metal strut extending from the frame hub radially outwardly toward the casing, a faring formed of a low coefficient of thermal expansion material, the fairing extending between the casing and the hub and disposed over the metal strut, the fairing biased in a radial direction by a flexing bracket which compensates for relative thermal growth between the fairing and one of the frame hub and the casing.

Optionally, the fairing assembly may further comprise a flange at either or both of an outer band and an inner band. The flange may have a single fastener mount or at least one multiple fastener mount. The multiple fastener mount may include a spacer formed of higher coefficient of thermal expansion material than a fastener extending therethrough. The spacer may have a shape that matches a profile of the multiple fastener mount. Alternatively, the fairing assembly may further comprising a clip assembly connected to the fairing. The clip assembly connects the fairing to an adjacent fairing. The clip assembly may being U-shaped or may be Y-shaped.

The fairing may comprise an inner band, an outer band and a hollow airfoil extending between the inner and the outer band. The fairing assembly may further comprise a plurality of fairings circumferentially arranged between the frame hub and the casing. The adjacent fairings may be connected by a fastening assembly. The fastening assembly may extend tangentially relative to the fairing. The fastening assembly may include a bolt and at least one spacer. The at least one spacer may be formed of a material having higher thermal coefficient of expansion than the bolt. The at least one spacer expands to maintain a tight connection as the fairings expand. The fairing may include at least one flange extending from an inner band and may include at least one flange extending from an outer band. The fairing assembly may further comprise the flexing bracket connected to the outer band. The flexing bracket may be disposed on the inner band. The flexing bracket defines a flexible connection between the fairing and the frame hub. The flexing bracket having a fastener opening through which a portion of the fastener assembly extends for connection to the fairing. The flexing bracket may further comprise a fastener opening for connecting the flexing bracket to the frame hub. The flexing bracket may have one aperture extending tangentially and one aperture extending radially.

This Brief Description is provided to introduce a selection of concepts in a simplified form that are further described below in the Detailed Description. This Brief Description is not intended to identify key features or essential features of the claimed subject matter, nor is it intended to be used to limit the scope of the claimed subject matter. All of the above outlined features are to be understood as exemplary only and many more features and objectives of the structures and methods may be gleaned from the disclosure herein. A more extensive presentation of features, details, utilities, and advantages of the embodiments of the present invention is provided in the following written description of various embodiments of the invention, illustrated in the accompanying drawings, and defined in the appended claims. Therefore, no limiting interpretation of the Brief Description is to be understood without further reading of the entire specification, claims and drawings included herewith.

BRIEF DESCRIPTION OF THE DRAWINGS

The above-mentioned and other features and advantages of these embodiments, and the manner of attaining them, will become more apparent and the embodiments will be better understood by reference to the following description taken in conjunction with the accompanying drawings, wherein.

DETAILED DESCRIPTION

Figure 1:
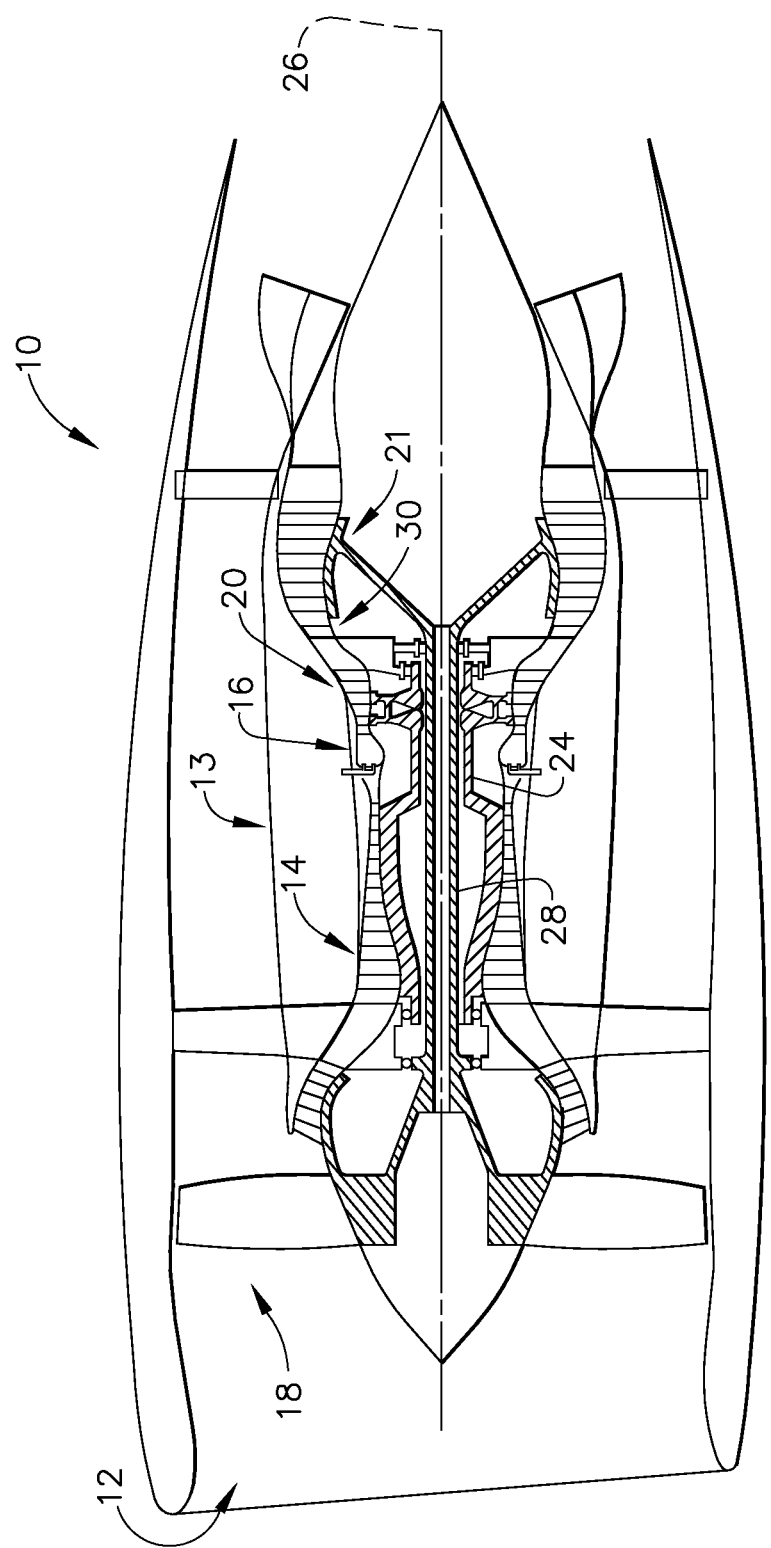
FIG. 1 side section view of an exemplary gas turbine engine.

It is to be understood that the depicted embodiments are not limited in application to the details of construction and the arrangement of components set forth in the following description or illustrated in the drawings. The depicted embodiments are capable of other embodiments and of being practiced or of being carried out in various ways. Each example is provided by way of explanation, not limitation of the disclosed embodiments. In fact, it will be apparent to those skilled in the art that various modifications and variations may be made in the present embodiments without departing from the scope or spirit of the disclosure. For instance, features illustrated or described as part of one embodiment may be used with another embodiment to still yield further embodiments. Thus, it is intended that the present disclosure covers such modifications and variations as come within the scope of the appended claims and their equivalents.

Embodiments of a turbine center frame fairing assembly are depicted in FIGS. 1-10. The fairing assembly includes a fairing formed of a lower coefficient of thermal expansion (lower alpha) material which is positioned over a metallic strut which has a higher coefficient of thermal expansion (higher alpha). The assembly provides a flexing bracket which biases the fairing assembly in one position and flexes when there is relative growth between the fairing and the strut to accommodate the differences in coefficient of thermal expansion between the two materials. Additionally, some embodiments provide spacer assemblies which maintain a desired clamping force between flanges of adjacent fairings. The structures provide high alpha spacer formed of materials which grow at a greater rate than the fastener so as to maintain the desired clamping force at either or both of the inner band connections and outer band connections.

The term "alpha" as in low alpha or high alpha is used, as understood by one skilled in the art, in reference to the coefficient of thermal expansion wherein a material with a low alpha is understood to have a low coefficient of thermal expansion and a material with a high alpha is understood to have a high coefficient of thermal expansion.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the understanding of the embodiments of the present invention, and do not create limitations, particularly as to the position, orientation, or use of the embodiments of the present invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Referring initially to FIG. 1, a schematic side section view of a gas turbine engine 10 is shown. The function of the turbine is to extract energy from high pressure and temperature combustion gases and convert the energy into mechanical energy for work. The turbine 10 has an engine inlet end 12 wherein air enters the core or propulsor 13 which is defined generally by a compressor 14, a combustor 16 and a multi-stage high pressure turbine 20 all located along an engine axis 26. Collectively, the propulsor 13 provides thrust or power during operation. The gas turbine 10 may be used for aviation, power generation, industrial, marine or the like.

In operation, air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the shaft 24. The shaft 24 passes toward the front of the engine to continue rotation of the one or more compressor stages 14, a turbofan 18 or inlet fan blades, depending on the turbine design. The turbofan 18 is connected by the shaft 28 to a low pressure turbine 21 and creates thrust for the turbine engine 10. The low pressure turbine 21 may also be utilized to extract further energy and power additional compressor stages.

With respect to the embodiments described herein, fairing assembly 30 is shown between the high pressure turbine 20 and the low pressure turbine 21. The fairing assembly 30 provides a flowpath between the high pressure and low pressure turbines. Similar constructions may be utilized in other areas of the engine including, but not limited to, the high and low pressure compressors.

Figure 2:
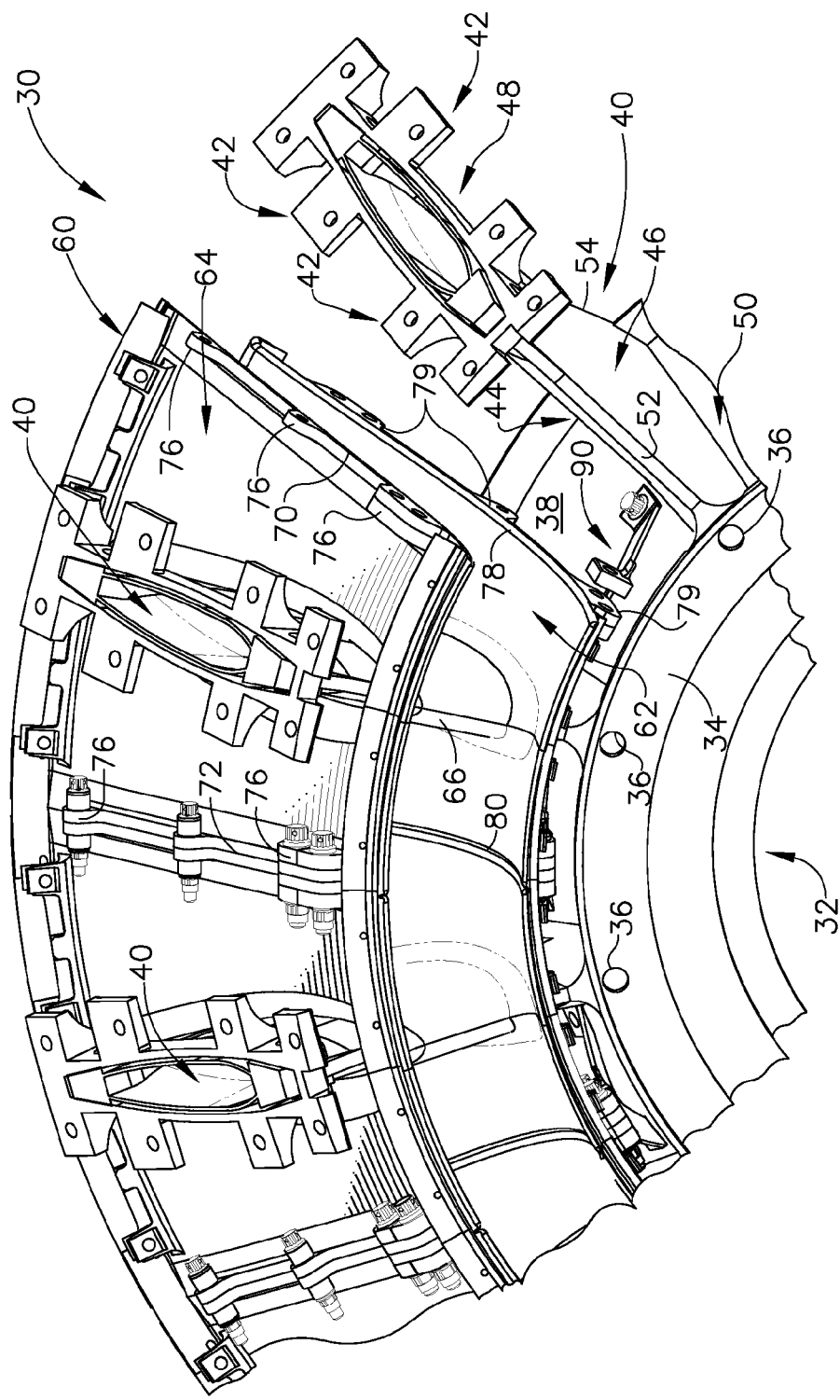
FIG. 2 is a perspective view of a partial assembly including the fairing assembly.
Figure 6:
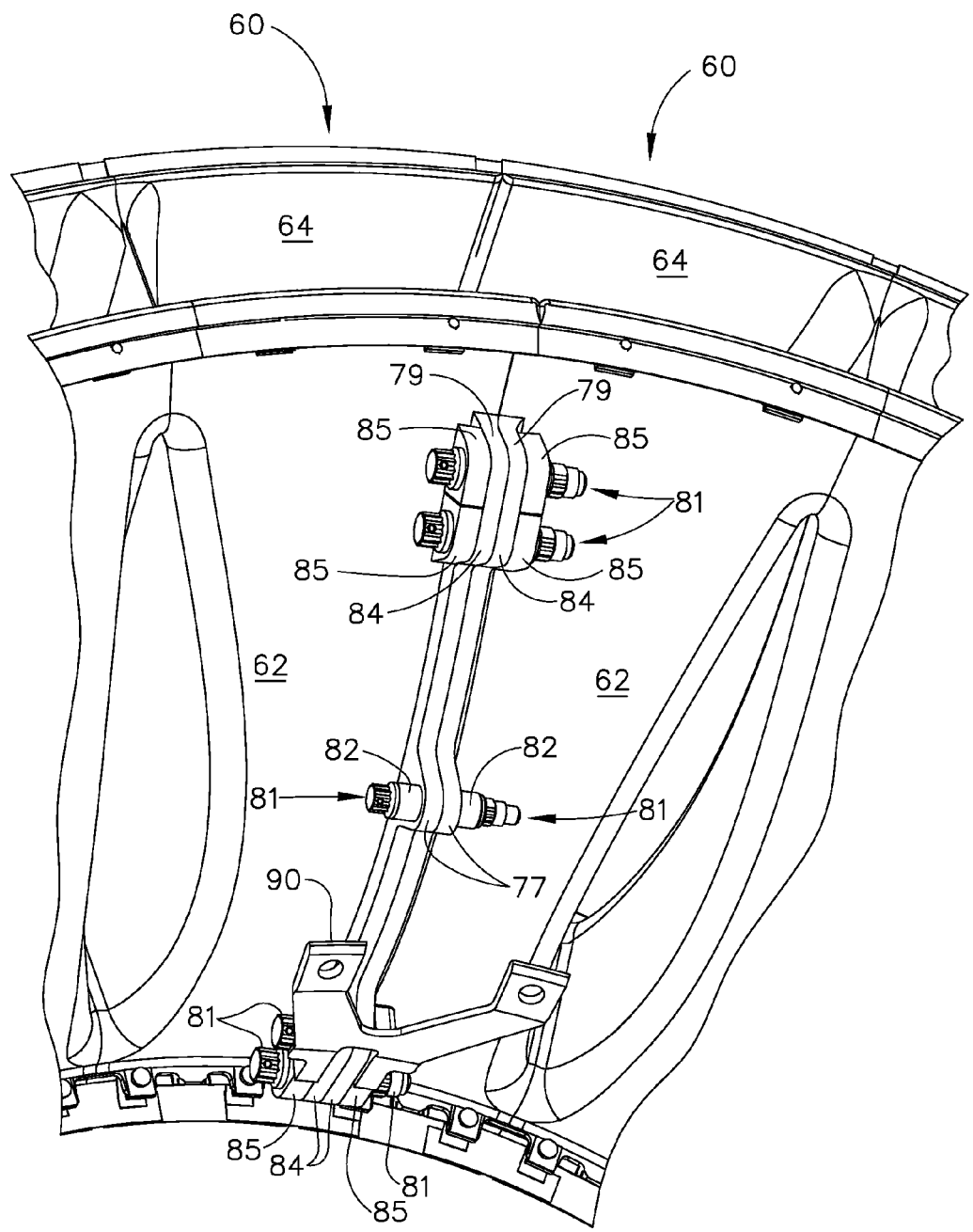
FIG. 6 is a lower perspective of the fairing assembly.

Referring now to FIG. 2, the fairing assembly 30 is depicted in perspective view. The fairing assembly 30 of the instant embodiment is located between a high pressure turbine and a low pressure turbine 20, 21. The fairing assembly 30 includes a frame hub 32 which extends circumferentially about the engine axis 26. In the instant embodiment, the frame hub 32 is shown partially extending circumferentially. The frame hub 32 may include surfaces at one or more various diameters and comprises a flange 34 with a plurality of fastening apertures 36 for connection of the frame hub 32 to a structure of at least one of the high pressure turbine 20 and the low pressure turbine 21. Extending from the flange 34, in an axial direction, is a hub surface 38 from which other structures may be connected or extend. The frame hub 32 allows transfer of loading from the hub 32 through various struts 40 to an engine casing 31 (FIG. 6). The surface 38 is shown extending in a horizontal axial direction from forward to aft ends of the frame 32. However, the surface 38 may be linear, or may be curved, and may be angled or tapered to vary in radius as measured from the engine axis 26 (FIG. 1).

Extending from the surface 38 are metallic struts 40 which may be formed integrally with the surface 38, may be welded, brazed or otherwise joined with the surface 38 or alternatively, may be fastened to the surface 38. The struts 40 provide a metallic structure which transfers load from the hub 32 to the engine casing for support of these components of the gas turbine engine 10. More specifically, the hub 32 supports the rotor (not shown) and transmits static and dynamic engine load through the struts 40 to the engine casing 31 (FIG. 6). The strut 40 may be formed of a higher alpha material than the fairing 60 low-alpha material. The strut 40 may be formed of, for non-limiting example, Nickel-based alloys. As shown at the right hand side of the figure, the strut 40 is depicted with a fairing 60 removed, as compared to the alternate circumferential locations of the hub 32. The metal strut 40 includes a plurality of lugs 42, which extend from an upper end of the metal strut 40 for connection to the engine casing 31 (FIG. 6). The lugs 42 may extend directly from the strut 40 or may be connected to a bracket 48 which is positioned at the end of the metal strut 40. This bracket 48 provides a removable structure which is positioned on the metal strut 40 after the fairing 60 is applied over the strut 40. The bracket 48 is shaped to extend about the upper perimeter of the strut 40. The lugs 42 extend from the bracket 48 for connection to an engine casing or other structure.

The strut includes a first side surface 44 and a second side surface 46 which extend between a radially inward end 50 and an outward end where the lugs 42 and bracket 48 are located. The surfaces 44, 46 meet at a leading edge 52 and extend axially to a trailing edge 54. The surfaces 44, 46 may be curved in shape to form an airfoil. The metallic strut 40 may be solid, hollow or partially hollow and may include one or more pathways for cooling air to move through the inside of the metal strut 40. The metal strut 40 is sized to move upwardly through the fairing 60. The fairing 60 may move in radial and axial directions relative to the strut 40 during times of thermal growth and expansion or thermal contraction. Growth due to thermal expansion may be in any directions.

Positioned over the metal strut 40 is the fairing 60 which protects the strut 40 from hot gas and which further provides a flowpath between the high pressure turbine 20 and low pressure turbine 21. The fairing 60 is supported by the metal strut 40 and may be formed of a different material than the metallic strut 40 such that the fairing 60 material has a low coefficient of thermal expansion and therefore, a different rate of thermal expansion than the metal strut 40. According to some examples, the second material may be a ceramic composite, a ceramic matrix composite or other lightweight material which has desirable thermal characteristics, but which may not have the same load carrying capability as the metallic strut 40.

The fairings 60 may be constructed of various low ductility and low coefficient of thermal CMC materials include a ceramic fiber, for example a silicon carbide (SiC), forms of which are coated with a compliant material such as boron nitride (BN). The fibers are coated in a ceramic type matrix, one form of which is silicon carbide (SiC). Typically, the fairing 60 can also be constructed of other low-ductility, high-temperature-capable materials. CMC materials generally have room temperature tensile ductility of less than or equal to about 1% which is used herein to define a low tensile ductility material. Generally, CMC materials have a room temperature tensile ductility in the range of about 0.4% to about 0.7%.

CMC materials have a characteristic wherein the materials tensile strength in the direction parallel to the length of the fibers (the "fiber direction") is stronger than the tensile strength in the direction perpendicular. This perpendicular direction may include matrix, interlaminar, secondary or tertiary fiber directions. Various physical properties may also differ between the fiber and the matrix directions.

The fairing 60 comprises an inner band 62, an outer band 64 and a vane 66 which is generally hollow to allow for positioning of the metal strut 40 therethrough. The inner band 62 may have a linear surface or may have a curvilinear surface so that the surface of the inner band 62 may extend purely axially or angled with both radial and axial components relative to the engine axis 26. In the instant embodiment, the assembly 30 is located between the high pressure turbine 20 and the low pressure turbine 21. Since the low pressure turbine 21 extends from the center line 26 of the engine a further radial distance than the high pressure turbine 20, the inner band 62 increases in radial dimension from the forward end of the inner band 62 to the aft end, when moving axially along the part. The inner band 62 comprises two lateral edges 78, 80 which extend between the forward end and the aft end of the part. These edges 78, 80 may be at an angle to the axial dimension so that the circumferential length of the inner band 62 at the forward end is less than the circumferential distance at the aft end of the part. This provides a frusto-conical shape for the bands 62, 64 when viewed from above or below. However, the edges 78, 80 may be parallel to the engine axis 26 as well. Located along the lateral edges 78, 80 and depending therefrom, are a plurality of flanges 79. The flanges 79 allow connection of adjacent fairings 60 so as to provide the circumferentially extending complete structure defined by multiple fairings. The flange 79 also provides location for connection of a flexing bracket 90 which connects the fairing 60 to the frame hub surface 38.

Positioned opposite the inner band 62 is the outer band 64 which comprises lateral edges 70, 72. The forward end of the inner band 62 may have a first circumferential length and the aft end of the outer band 64 may have a larger second circumferential length so that the outer band 64, similar to the inner band 62, has a frusto-conical shape when viewed from above. However, other shapes may be utilized and this description is merely exemplary. The outer band 64 may extend in a purely axial direction, or may vary in radial distance from the center line 26 of the engine as with the inner band 62. Thus, the outer band 64 may have a linearly extending surface or may be curvilinear moving between the forward end and the aft end.

The outer band 64 includes a flange 76 located along the lateral edges 70, 72. This allows for connection between adjacent fairings 60 at the outer band 64 area similar to the design at the inner band 62. The connections may be bolted together for removal during maintenance procedures or if a band is damaged and needs replacement. The flanges 76 allow for bolted connection in a tangential direction.

Extending between the outer band 64 and the inner band 62 is a vane 66. The vane 66 has a generally airfoil like shape between a leading edge 52 and a trailing edge 54. The hollow vane 66 allows for positioning of the metal strut 40 therethrough. The vane 66, inner band 62 and outer band 64 are formed of a low thermal expansion material such as ceramic matrix composite, for non-limiting example. During operation, the growth rate of the metallic strut 40 will differ from the fairing 60. As a result, the two parts will have relative movement therebetween. The present assembly 30 provides that the fairing 60 may grow a different rate than the metal strut 40 without harming the assembly 30.

In order to accommodate and compensate for this differential relative growth, the flexing bracket 90 applies a biasing force on the fairing 60 when the engine 10 is cooled or cold. Further, the flexing bracket 90 allows for growth of the fairing 60 in a radial direction relative to the metal strut 40 during operation, when the engine is at a much higher operating temperature.

Figure 3:
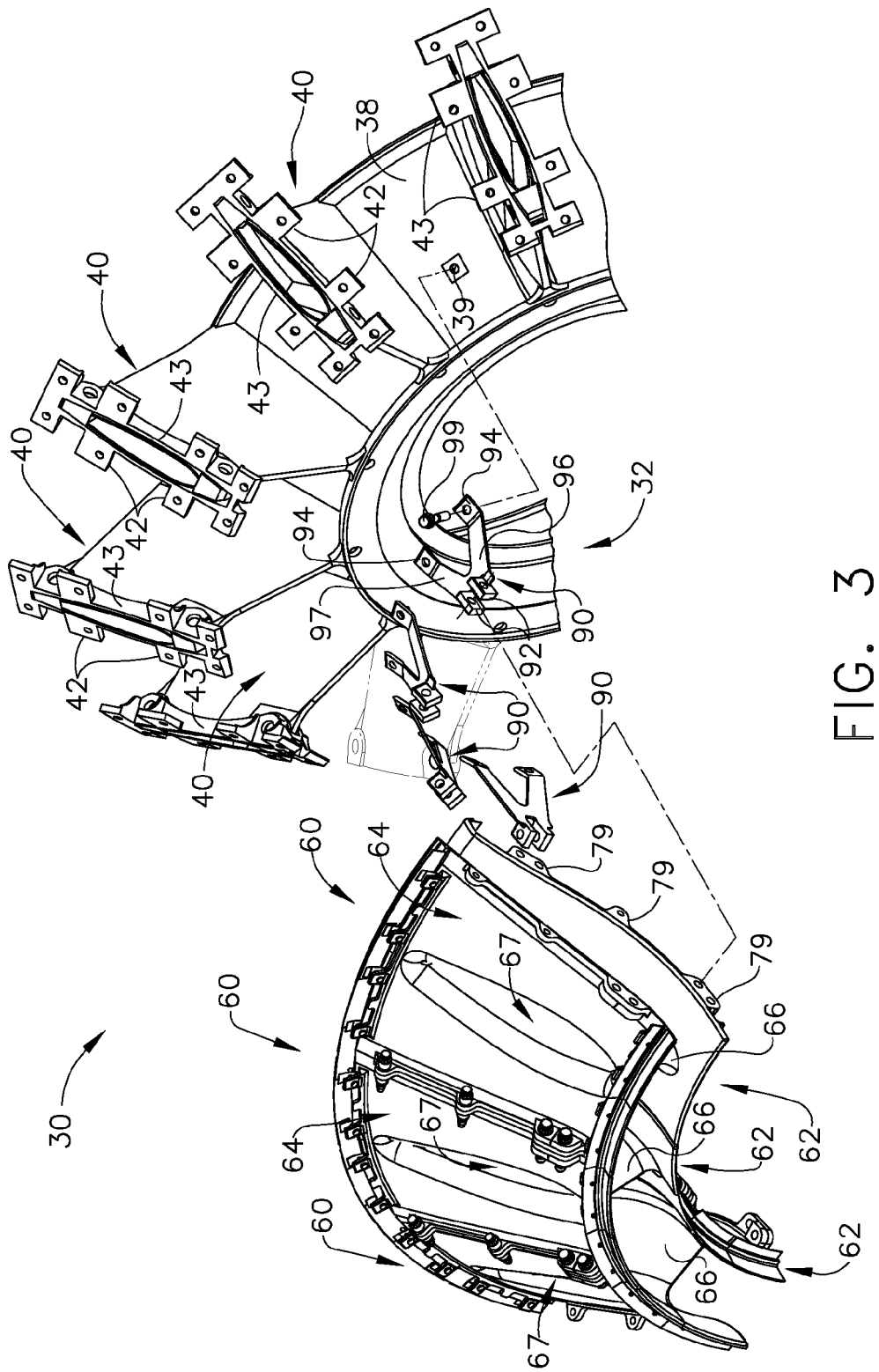
FIG. 3 is an exploded assembly view of the fairing assembly of FIG. 2.

Referring now to FIG. 3, an exploded assembly view of the fairing assembly 30 is depicted. Starting at the left hand end of the figure, multiple fairings 60 are shown removed from the metal strut 40. Each of the inner bands 62 have flanges 79 which are connected to an adjacent flange 79 of an adjacent fairing 60. The inner band 62, vane 66 and outer band 64 are formed such that a hollow interior 67 of the vane 66 may receive the metal struts 40 which extend from the frame hub 32. In the embodiment shown, the brackets 43, including lugs 42, are already positioned on the metal strut 40 at the outer end. However, in actuality, the fairing 60 must be positioned over the strut 40 and the brackets 43, including lugs 42 subsequently added after the fairing 60 is properly positioned. This configuration allows load to be transferred from the hub 32 to the engine casing through the strut 40. This configuration limits weight and dynamic engine loading on the fairing 60, which is formed of low-alpha material and of less strength than the metal strut 40.

As briefly discussed previously, a flexing bracket 90 is utilized to connect the fairing 60 to the frame hub 32. Specifically, the bracket 90 connects to the fairing 60 along adjacent lower flanges 79 and extends downwardly to the frame hub surface 38 for connection through aperture 39. The flexing bracket 90 provides a biasing force on the fairing 60 when the engine is cold. Additionally, the flexing bracket 90 flexes when the fairing 60 grows in a radial direction during engine operation to accommodate such growth. Thus, the fairing 60 may "float" to some extent along the length of the metal strut 40 in the radial direction as the strut 40 thermally grows during operation.

The flexible bracket 90 includes at least one forward end flange 92 which connects to the flanges 79 of the fairing 60. The forward end flange 92 may have two flanges which clamp on two adjacent flanges 79 to retain the adjacent fairings 60 together. Extending from the flange 92 is a spring section 96, 97 which provides biasing force on the fairing 60. At a second end of the flange 92 of the bracket 90 is at least one hub flange 94. The hub flange 94 includes a fastening aperture allowing a fastening or bolt connection to the bracket 90 and the frame hub surface 38 by way of aperture 39. The instant embodiment includes two flanges 94, one at each end of spring sections 96, 97. A fastener passes through the frame hub flange 94 and aperture 39 in a radial direction. At the first end of the bracket 90, the flange 92 allows for passage of a fastener 99 in a tangential direction relative to the inner band 62 and through flange 79. The brackets 90 are generally v-shaped such that the spring sections 96, 97 extend from a joined location at the flanges 92 to the separate frame hub flanges 94. The spring sections 96, 97 are generally linear in the depicted embodiment. However, the shape may also be curvilinear or otherwise have some contour. The thickness of the spring sections 96, 97 may vary in the direction moving forward to aft but alternatively, may vary in thickness or may be a constant thickness material. Additionally, while a v-shape is depicted for the bracket, various other shapes may be utilized so long as the bracket 90 applies a biasing force to the fairing 60 while allowing for relative thermal growth between the fairing 60 and the metal strut 40. For example, each bracket 90 may include a single spring section rather than two.

Figure 4:
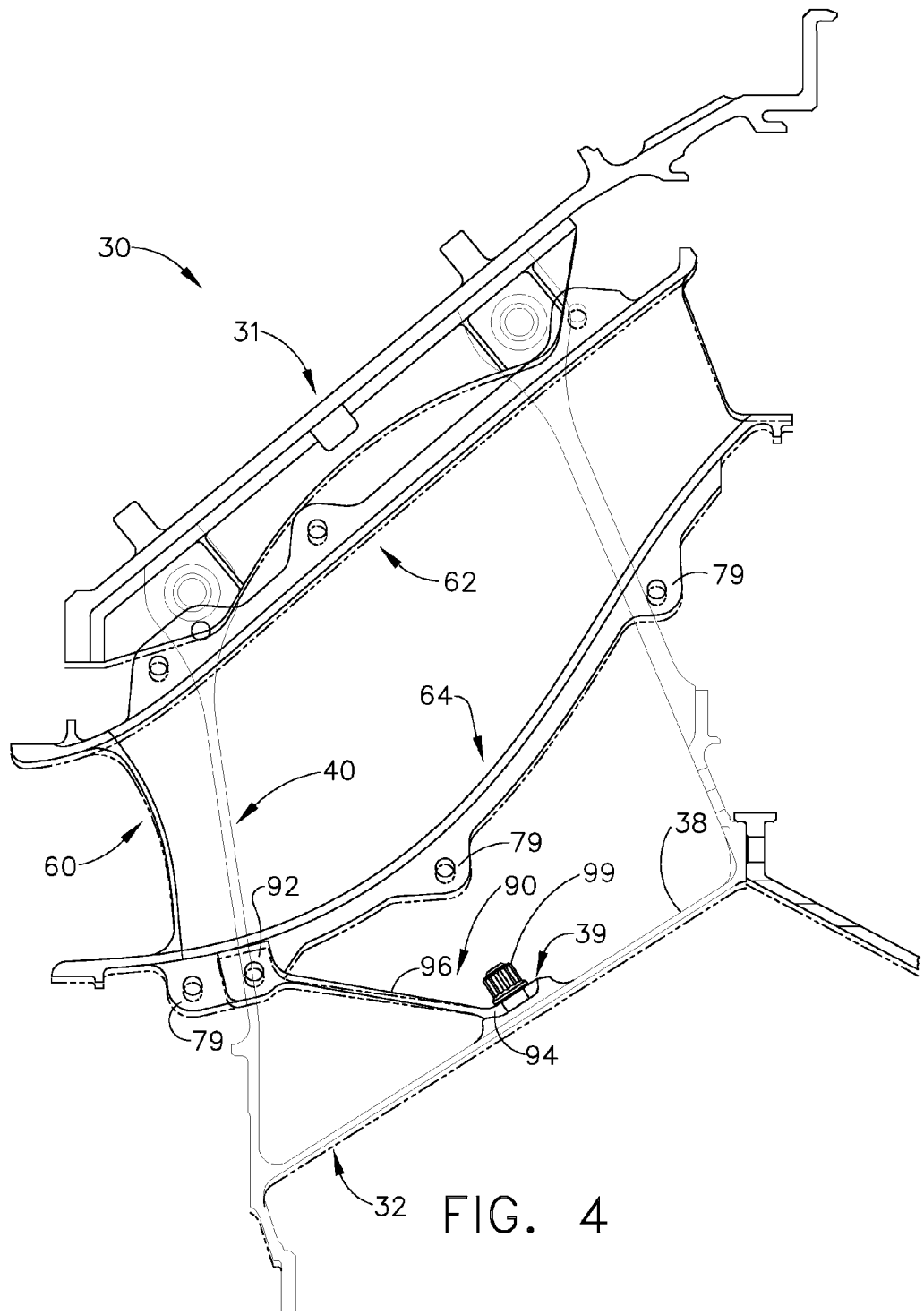
FIG. 4 is a side view of the fairing assembly with flexing bracket compressed.

Referring now to FIG. 4, the fairing assembly 30 is depicted in a side view. At the upper end of the fairing 60 is an engine casing 31 to which the metal strut 40 is connected. This connection allows transfer of loading from the frame hub 32 through the strut 40, which is a higher strength material, and onto the engine casing 31. Beneath the engine casing 31 is the fairing 60 with the hollow interior allowing passage of the metal strut 40 therethrough. At the lower or inner band 62, the flange 79 is shown and the first bracket flange 92 is connected to flange 79. The flexing bracket 90 extends to the frame hub 32, and specifically, the surface 38. Within the frame hub surface 38 is the aperture 39. A fastener 99 extends through the second bracket flange 94 and through the aperture 39 to connect the structures. Likewise, a fastener assembly extends through the first flange 92 and the inner band 62 of the fairing 60.

The figure shows the changing of the flexing bracket 90, specifically the spring section 96. The structure is shown in solid line in a first position wherein the engine 10 is in a cold condition and the fairing 60 is of a shorter radial length and the frame hub 32 is farther from the fairing 60. In a second position, at higher operating temperature, the frame hub 32, formed of higher alpha material will expand at a rate greater than that of the fairing 60. As a result, the frame 32 will expand at least some amount in the radial direction and cause flexing of the bracket 90. However, despite the difference in growth rate, the flexible bracket 90 maintains a connection between the fairing 60 and the frame hub 32 while allowing for the relative growth of the fairing 60 relative to the metal strut 40.

Figure 5:
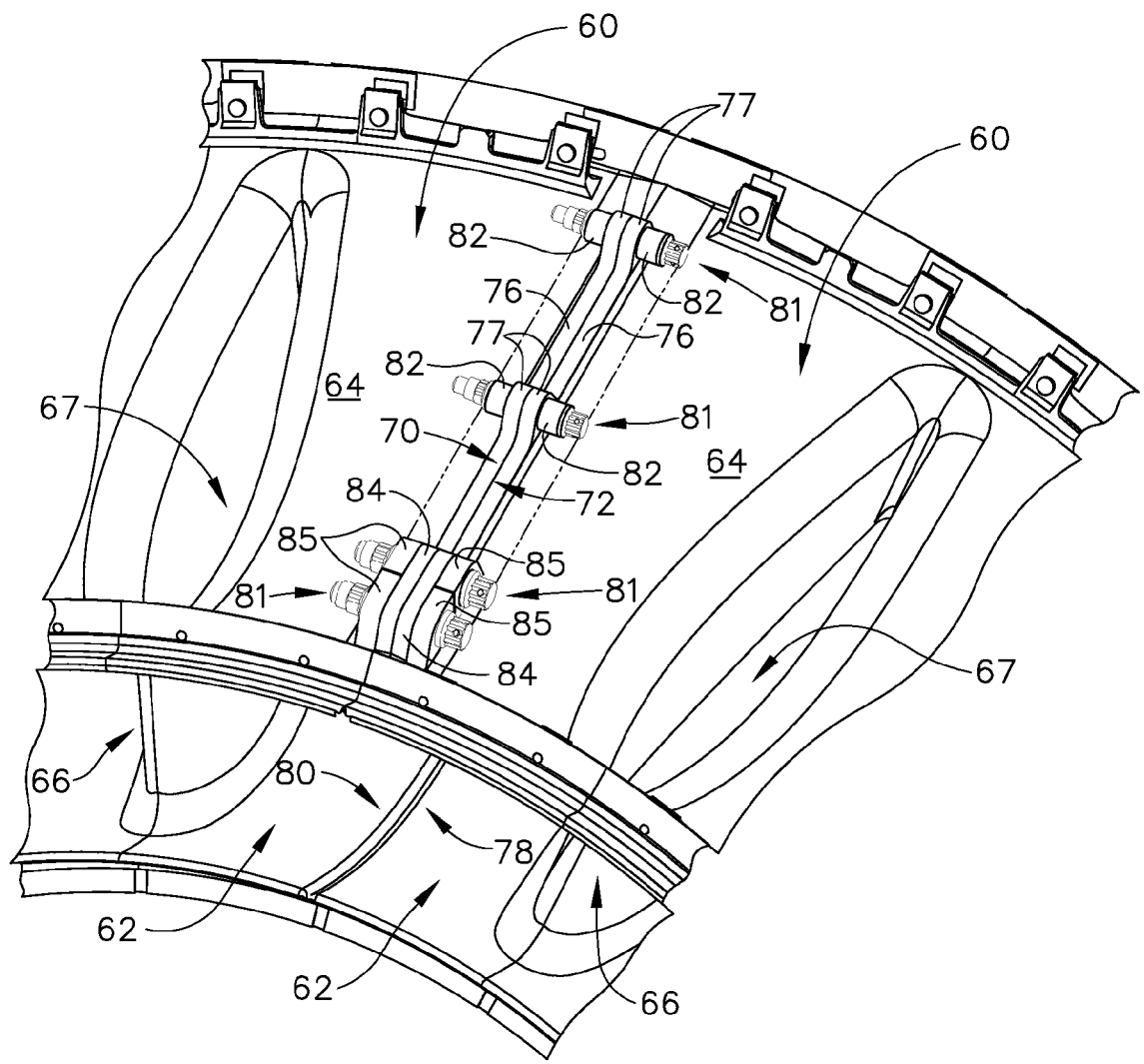
FIG. 5 is an upper view of the fairing assembly.

Referring to FIG. 5, an upper perspective view of adjacent fairings 60 is shown to depict the connection along the lateral edges 70, 72 of each fairing. The fairing 60 includes the outer band 64, the inner band 62 and vane 66, extending between the inner and outer bands 62, 64. Each vane 66 is hollow with a hollow interior 67 such that the metal strut 40 can pass therethrough.

At the lateral edges 70, 72 of the outer band 64, are flanges 76 which extend in a substantially axial direction. The flanges 76 allow for connection of adjacent outer bands 64 to define the circumferential structure which extends about the engine axis 26. The flanges 76 include a plurality of raised mounts 77. The mounts 77 allow for single bolt connections to tighten adjacent edges of fairings 60 together. It may be desirable to provide a tight connection in these areas to preclude non-flowpath air, for example above the outer band 64 from passing between adjacent outer bands 64 and entering the flow path area between the outer band 64 and inner bands 62. Additionally, each of the fastening assemblies 81 includes a spacer 82 which have a coefficient of the thermal expansion. This high coefficient of thermal expansion material in the spacers 82 grows in an axial direction relative to the bolt or fastener centerline so as to maintain clamping force on the flange 76 when the engine is heated to operating temperature. Additionally, the spacer 82 material maintains ample clamping force for the fastener assemblies 81 when the engine is in a cold condition.

At the forward end of the fairings 60, a multi-bolt mount 84 is provided. The mounts allow for 360 degrees of connection under all operating conditions so as to reduce leakage. Additionally, the multi-bolt mounts 84 are positioned in the locations shown due to finite element analysis. The analysis indicates that in stall condition, the loading on the fairing is increased at the location where the multi-bolt mounts 84 are disposed. Accordingly, the multi-bolt mounts 84 are utilized in these locations to compensate for such loading. Elsewhere, single bolt mounts may be utilized to reduce weight. The forward mounts 84 include spacers 85 which are sized to have a greater surface area than the spacers 82. The spacers 85 are also formed of high coefficient of thermal expansion material which is greater than the coefficient of thermal expansion of the fastener assemblies 81. The spacers 85 are generally polygon shaped but have curved corners so as to match the shape of the dual mount flanges 84. This provides a larger surface area to clamp at and reduces the pressure on the CMC by increasing the surface area which is clamped as compared to the mounts 77 and spacers 82. Additionally, the multiple fastener assemblies 81 again provide for improved inhibition of leakage from the non-flowpath side of the fairing assembly to the flowpath side, between the inner and about bands 62, 64.

Referring to FIG. 6, the flange 79 is depicted extending between adjacent inner bands 62. The inner flange 79 includes the plurality of single fastener mounts 77 and multiple fastener mounts 84. Adjacent to the fastener mounts 84 are spacers 85 which are formed to match the profile of the multiple fastener mounts 84 of the flange 79. As previously described, the desired function is to preclude air leakage from the non-flowpath side of the fairings 60 to the flowpath side, between the inner and outer bands 62, 64. The flange 79 also includes at least one single fastener mount 77. The fastener assembly 81 includes spacers 82 which are cylindrical and do not have any shape which increases the surface area for improving clamping against the mounts 77.

At the forward end of the assembly, a multi-fastener mount 84 is also located. The forward end of the mount 84 includes two spacers 85 which are formed as previously discussed of a high coefficient thermal expansion material. Aft of the spacers 85 is a locating for mounting of the bracket 90 to the inner band 62. Thus, the flexible bracket 90, specifically the bracket flange 92 engages with the fastener assembly 81 to provide clamping force for the flanges 79 at the forward end of the inner band 62.

Figure 7:
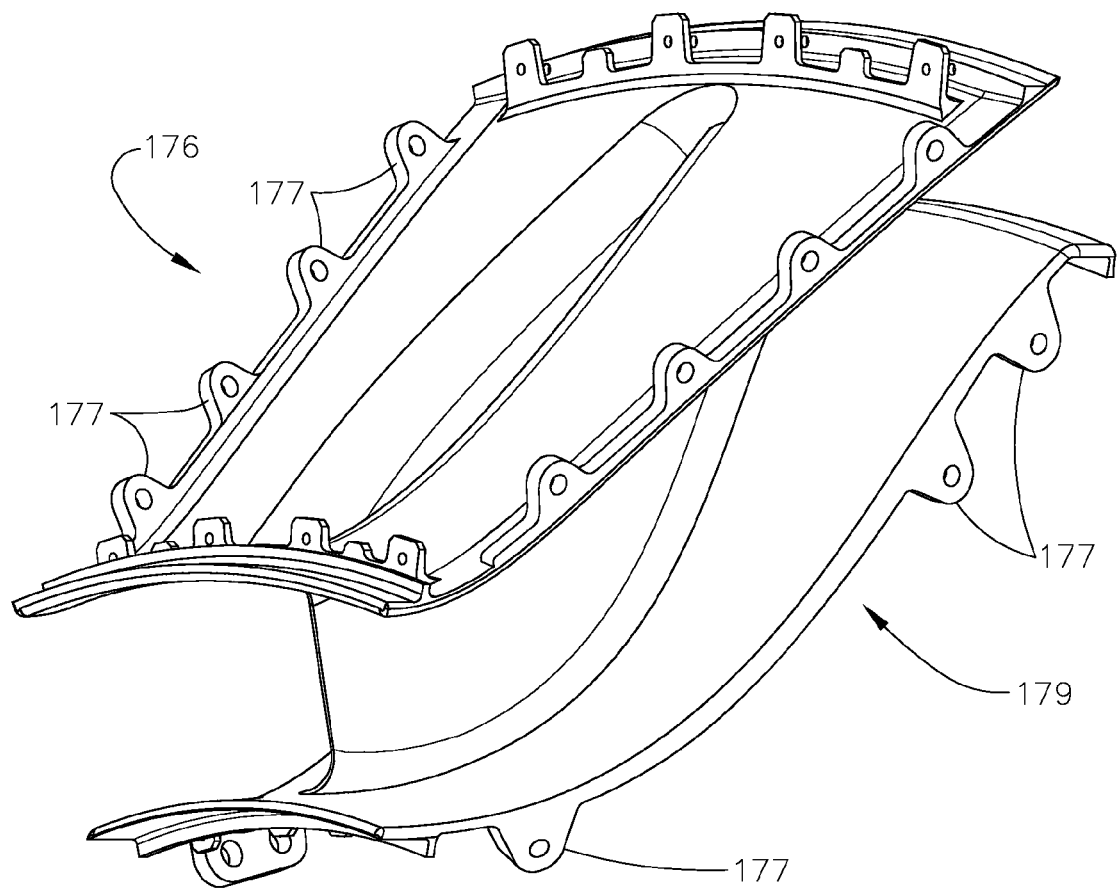
FIG. 7 is a perspective view of a fairing with alternative flange arrangement.

Referring now to FIG. 7, an alternate embodiment is depicted where all of the flanges 179, 176 are single bolt type assemblies. The upper flange on the outer band 64 includes a plurality of single bolt mounts 177. Additionally, the lower flange 179 of the inner band 62 includes a plurality of single fastener mounts 177 as well. It should be understood that the single fastening mounts 77, 177 may be utilized alone or in combination with the multi-fastener mounts 84 of the previously described embodiment.

Figure 8:
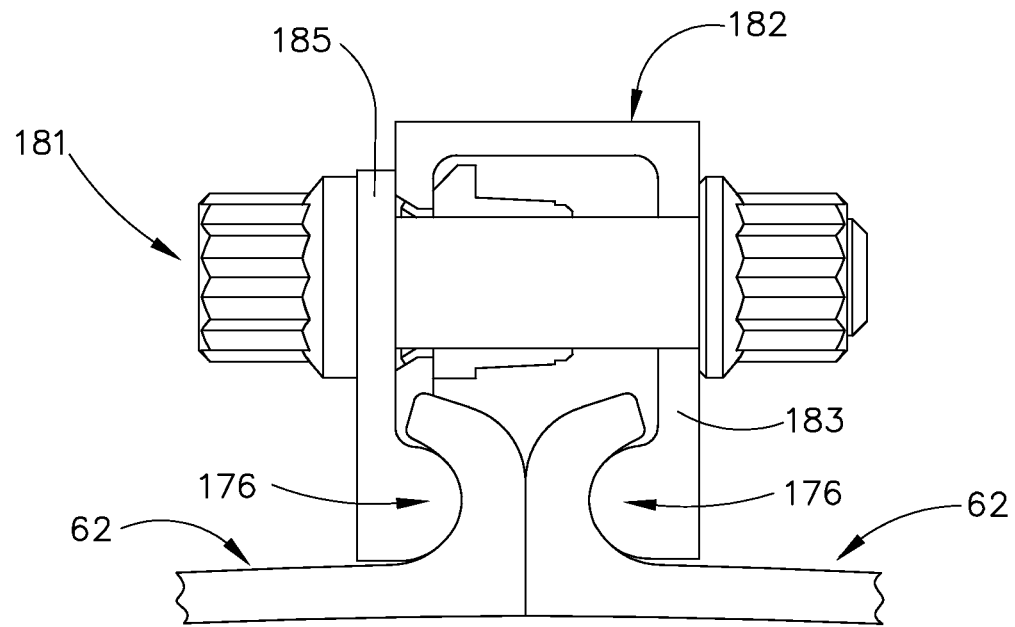
FIG. 8 is an alternative embodiment to the spacer and fastener assembly.
Figure 9:
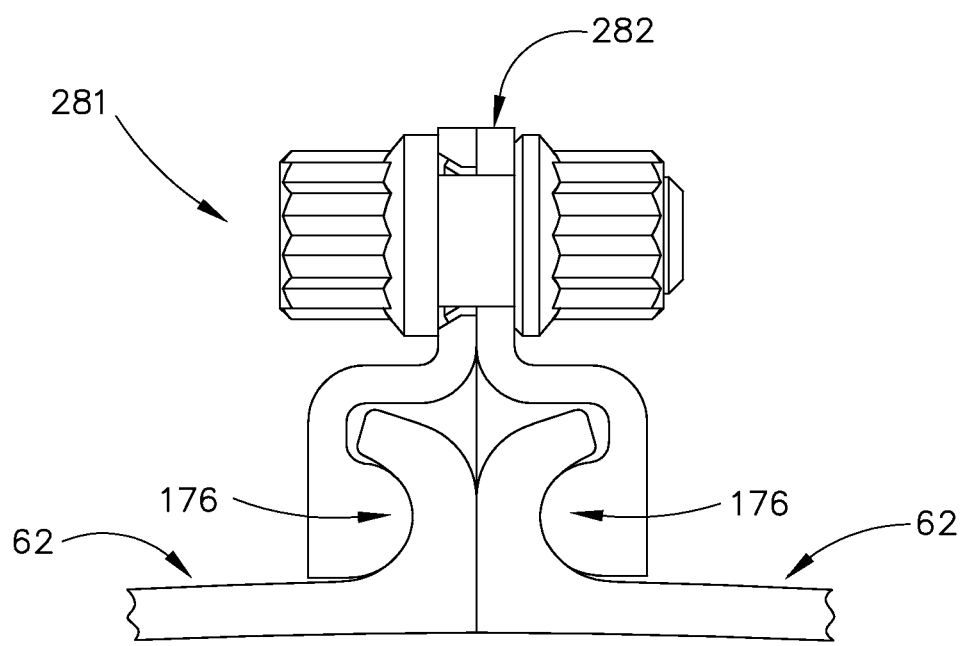
FIG. 9 is an alternative embodiment of FIG. 8.

Referring now to FIG. 8, an end view, aft looking forward, is depicted of an alternative flange arrangement. The embodiment provides that the inner and outer bands 62, 64 have lip-type flanges 176. The flanges 176 extend radially and turn circumferentially to create grasping spaces. A clip 182 is connected by a fastener assembly 181. The clip 182 may be formed of a single piece of material which is generally U-shaped or alternatively, as depicted, may be formed of multiple pieces which are fastened together in the manner shown or in an alternative arrangement. The instant embodiment 182 includes a first leg 183 and second leg 185 which engage said flanges 176 to clamp the inner and outer bands 62, 64. The spacer 182 may be formed of a high coefficient of thermal expansion material which maintains clamping force when the engine heats and additionally which has a higher alpha than the fastener assembly 181. Accordingly, the clip 182 expands more than the fastener assembly 181 expands in the axial direction of the bolt or fastener. The clip concept may be utilized as it has a reduced flange height and allows for relatively easy installation. The embodiment depicted is U-shaped in end or section view. However, with reference to FIG. 9, an alternate embodiment is depicted where two structures 281, 282 are utilized to form the clip. The structures 281, 282 may extend upwardly as shown and turn inwardly toward the center of the joint for fastening such that the structure has a generally Y-shaped configuration as shown.

Figure 10:
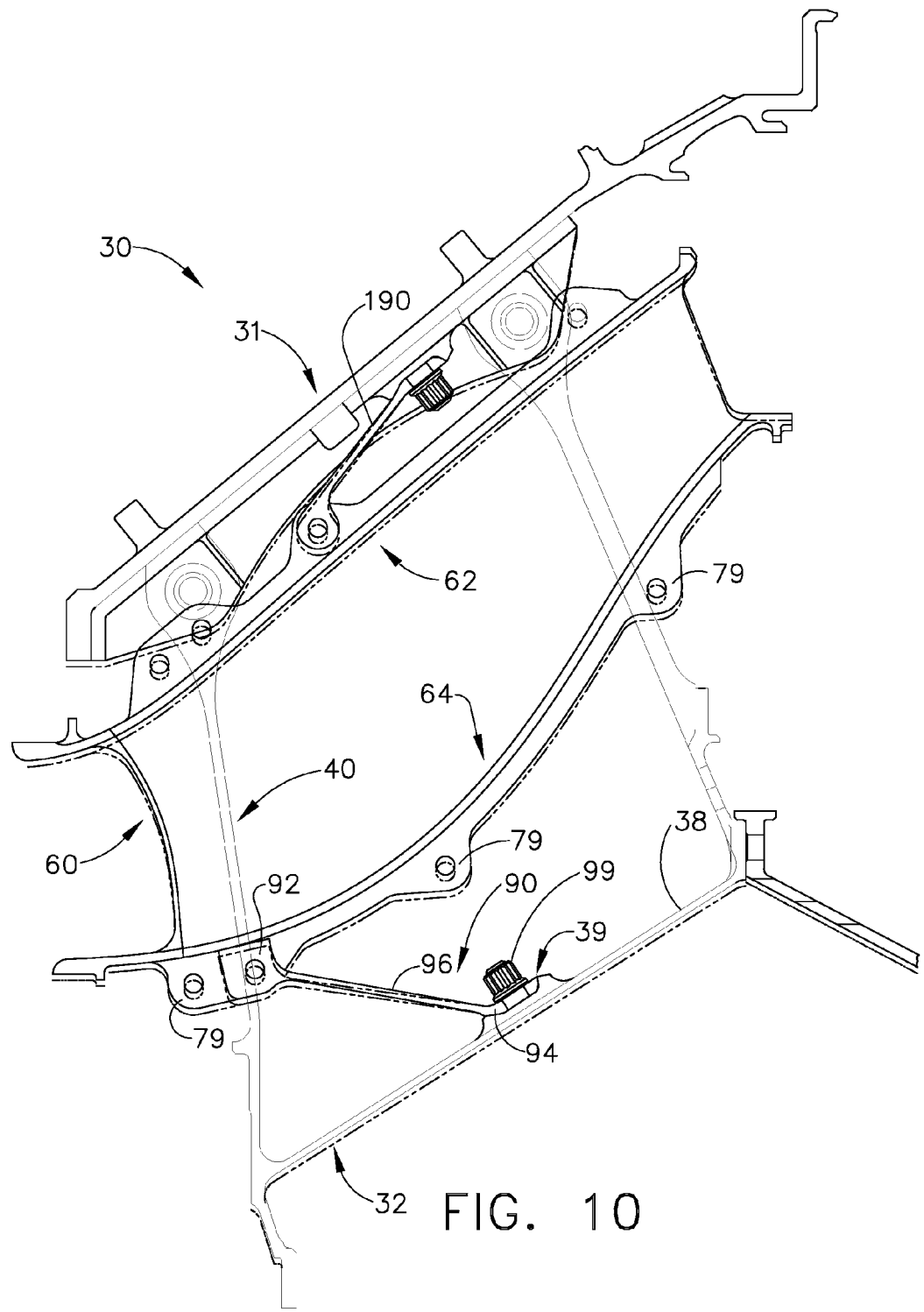
FIG. 10 is an alternative embodiment disclosing an alternative flexing bracket configuration which may be connected at a radially outer end of the fairing.

Referring now to FIG. 10, an alternative flexing bracket arrangement is depicted wherein a bracket 190 may be mounted at the upper end of the fairing to provide biasing as against the engine casing and provide for some amount of compensation for different rates of thermal growth between the metallic engine casing and the fairing of lower coefficient of thermal expansion. The bracket 190 provides a biasing force as in the previous embodiment in the radial direction but is located in a different location. Additionally, it should be understood by one skilled in the art that the bracket 190 may be used at the lower end of the fairing or the upper end or both as depicted.

The foregoing description of several embodiments of the invention has been presented for purposes of illustration. It is not intended to be exhaustive or to limit the embodiments of the invention to the precise steps and/or forms disclosed, and obviously many modifications and variations are possible in light of the above teaching. It is intended that the scope of the disclosure and all equivalents be defined by the claims appended hereto.

What is claimed is:

1. A fairing assembly, comprising:
   a frame hub which is spaced radially inwardly from a casing;
   a metal strut extending from said frame hub radially outwardly toward said casing; and
   a fairing formed of a low coefficient of thermal expansion material having a different rate of thermal expansion than the metal strut, said fairing extending between said casing and said hub and disposed over said metal strut;
   wherein said fairing is biased in a radial direction by a flexing bracket which compensates for relative thermal growth between said fairing and one of said frame hub and said casing.

2. The fairing assembly of claim 1, further comprising a flange at an outer band and an inner band.

3. The fairing assembly of claim 2, said flange having a single fastener mount.

4. The fairing assembly of claim 3, further comprising at least one multiple fastener mount.

5. The fairing assembly of claim 4, said multiple fastener mount including a spacer formed of a higher coefficient of thermal expansion material than a fastener extending therethrough.

6. The fairing assembly of claim 5, said spacer having a shape that matches a profile of the multiple fastener mount.

7. The fairing assembly of claim 1, further comprising a clip assembly connected to said fairing.

8. The fairing assembly of claim 7, said clip assembly connecting said fairing to an adjacent fairing.

9. The fairing assembly of claim 8, said clip assembly being U-shaped.

10. The fairing assembly of claim 8, said clip assembly being Y-shaped.

11. The fairing assembly of claim 1, said fairing comprising an inner band, an outer band, and a hollow airfoil extending between said inner and outer band.

12. The fairing assembly of claim 11, further comprising a plurality of fairings circumferentially arranged between said frame hub and casing.

13. The fairing assembly of claim 12, wherein adjacent fairings are connected by a fastening assembly.

14. The fairing assembly of claim 13, said fastening assembly extending tangentially relative to said fairing.

15. The fairing assembly of claim 13, said fastening assembly including a bolt and at least one spacer.

16. The fairing assembly of claim 15, said at least one spacer being formed of a material having a higher thermal coefficient of expansion than said bolt.

17. The fairing assembly of claim 13, said fairing including at least one flange extending from an inner band.

18. The fairing assembly of claim 13, said fairing including at least one flange extending from an outer band.

19. The fairing assembly of claim 18, further comprising said flexing bracket connected to said outer band.

20. The fairing assembly of claim 19, said flexing bracket defining a flexible connection between said fairing and said frame hub.

* * * * *